United States Patent
Yang et al.

(10) Patent No.: US 11,762,434 B2
(45) Date of Patent: Sep. 19, 2023

(54) DIRECT BACKLIGHT FOR A DISPLAY, WITH LIGHT BARS IN DIFFERENT PLANES

(71) Applicant: Wistron Corporation, New Taipei (TW)

(72) Inventors: Yao-Chen Yang, New Taipei (TW); Liang Yang, New Taipei (TW); Zhihua Liu, New Taipei (TW); Zhiyi Liang, New Taipei (TW); Chih-Chou Chou, New Taipei (TW)

(73) Assignee: Wistron Corporation, New Taipei (TW)

( * ) Notice: Subject to any disclaimer, the term of this patent is extended or adjusted under 35 U.S.C. 154(b) by 0 days.

(21) Appl. No.: 17/382,373

(22) Filed: Jul. 22, 2021

(65) Prior Publication Data

US 2022/0342459 A1 Oct. 27, 2022

(30) Foreign Application Priority Data

Apr. 23, 2021 (CN) .......................... 202110443733.2

(51) Int. Cl.
*F21V 15/01* (2006.01)
*G06F 1/18* (2006.01)
*F21V 8/00* (2006.01)
*F21Y 107/50* (2016.01)

(52) U.S. Cl.
CPC .............. *G06F 1/181* (2013.01); *F21V 15/01* (2013.01); *G02B 6/0068* (2013.01); *G02B 6/0081* (2013.01); *F21Y 2107/50* (2016.08); *G06F 1/183* (2013.01)

(58) Field of Classification Search
CPC .... F21V 15/01; F21Y 2107/50; G09F 13/147; G09F 13/0418
See application file for complete search history.

(56) References Cited

U.S. PATENT DOCUMENTS

| 4,335,421 A | * | 6/1982 | Modia | F21V 3/04 362/346 |
| 4,654,629 A | * | 3/1987 | Bezos | B61L 15/02 340/815.45 |
| 7,259,810 B2 | * | 8/2007 | Kim | G02F 1/133605 362/330 |
| 7,918,575 B2 | * | 4/2011 | Ho | F21K 9/00 362/249.02 |

(Continued)

FOREIGN PATENT DOCUMENTS

WO 2013/038802 A1 3/2013
WO WO-2013038802 A1 * 3/2013 ....... G02F 1/133603

*Primary Examiner* — Ismael Negron
(74) *Attorney, Agent, or Firm* — Winston Hsu

(57) ABSTRACT

A backlight includes a first casing having an opening; a second casing connected to the first casing; an optical member disposed between the first casing and the second casing, and exposed via the opening; a supporting back plate disposed between the optical member and the second casing; at least one circuit board disposed between the supporting back plate and the second casing; and a plurality of light bars disposed on the supporting back plate. The supporting back plate is disposed between the second casing and optical member. The supporting back plate includes a first area and a second area, configured such that a distance from the first area to the second casing is greater than a distance from the second area to the second casing.

18 Claims, 8 Drawing Sheets

(56) References Cited

U.S. PATENT DOCUMENTS

| | | | | |
|---|---|---|---|---|
| 8,075,150 B2* | 12/2011 | Maruyama | ........ | G02F 1/133603 |
| | | | | 362/580 |
| 9,140,931 B2* | 9/2015 | He | ................. | G02F 1/133611 |
| 9,429,792 B2* | 8/2016 | Jia | ................. | G02F 1/133602 |
| 10,007,145 B2* | 6/2018 | Liu | ................. | G02F 1/133608 |
| 10,101,610 B2* | 10/2018 | Kang | ............... | G02F 1/133603 |
| 2006/0203465 A1* | 9/2006 | Chang | .............. | G02F 1/133603 |
| | | | | 362/240 |
| 2008/0150884 A1* | 6/2008 | Ito | ................. | G02F 1/133606 |
| | | | | 345/102 |
| 2012/0169943 A1* | 7/2012 | Kuromizu | ........ | G02F 1/133611 |
| | | | | 348/790 |
| 2012/0176557 A1* | 7/2012 | Shimizu | ........... | G02F 1/133605 |
| | | | | 362/310 |

* cited by examiner

DIRECT BACKLIGHT FOR A DISPLAY, WITH LIGHT BARS IN DIFFERENT PLANES

BACKGROUND OF THE INVENTION

1. Field of the Invention

The present invention relates to a direct back-lit display, and more particularly, to a supporting back and a direct back-lit display with a thin type.

2. Description of the Prior Art

A conventional direct back-lit display disposes a metal back plate, a circuit board, a panel module and other components between the front frame and the rear frame. The rear frame is an arc structure; distances of two ends of the rear frame relative to the front frame are short, and a distance of a center of the rear frame relative to the front frame is long to form a chamber. The circuit board is disposed on a central area of the metal back plate, and aligns with the center of the rear frame to dispose inside the foresaid chamber. However, the arc structure of the rear frame of the conventional direct back-lit display has a large curvature, and the distance of the center of the rear frame relative to the front frame is greater than a structural height of the circuit board. Thus, the conventional direct back-lit display cannot provide a thin type and be unsuitable for a market demand of the consumer display product, and design of the direct back-lit display with a thin-type is an important issue in the display industry.

SUMMARY OF THE INVENTION

The present invention provides a supporting back and a direct back-lit display with a thin type for solving above drawbacks.

According to the claimed invention, a direct back-lit display with a thin type includes a first casing, a second casing, an optical member, at least one circuit board, a supporting back plate and a plurality of light bars. The first casing has an opening portion. The second casing is connected to the first casing. The optical member is disposed between the first casing and the second casing, and exposed via the opening portion. The supporting back plate is disposed between the second casing and optical member. The supporting back plate has a first area and a second area connected to each other. A distance from the first area to the second casing is greater than a distance from the second area to the second casing, or a distance from the first area to the first casing is smaller than a distance from the second area to the first casing. The circuit board is disposed on the first area. The plurality of light bars is disposed on the supporting back plate.

According to the claimed invention, the supporting back plate further has a bridging area connected between the first area and the second area. An angle of the bridging area relative to the first area is greater than ninety degrees, or an angle of the bridging area relative to the second area is greater than ninety degrees.

According to the claimed invention, the supporting back plate includes a reflection member. The reflection member has a first section, a second section and a bridging section connected to each other. The first section and the second section respectively correspond to the first area and the second area. The bridging section is bent between the first section and the second section. An angle of the bridging section relative to the first section is greater than ninety degrees, and an angle of the bridging section relative to the second section is greater than ninety degrees.

According to the claimed invention, the angle corresponds to an illumination angle of at least one of the plurality of light bars.

According to the claimed invention, the supporting back plate further has a third area disposed on a side of the second area opposite to the first area, and a distance from the third area to the second casing is greater than the distance from the second area to the second casing, or a distance from the third area to the first casing is smaller than a distance from the second area to the first casing.

According to the claimed invention, the optical member includes a diffusing member, and the diffusing member has a first region and a second region connected to each other. The first region and the second region respectively correspond to the first area and the second area, and a shading rate of the first region is different from a shading rate of the second region.

According to the claimed invention, the optical member includes a plurality of light absorbing components disposed on the diffusing member. One of the plurality of light absorbing components disposed on the first region has light absorbing efficiency greater than light absorbing efficiency of other light absorbing components disposed on the second region.

According to the claimed invention, one of the plurality of light absorbing components disposed on a border between the first region and the second region has light absorbing efficiency smaller than the light absorbing efficiency of other light absorbing component disposed on the first region, and greater than the light absorbing efficiency of other light absorbing component disposed on the second region.

According to the claimed invention, the plurality of light absorbing components is printed dots or filter material.

According to the claimed invention, the direct back-lit display further includes at least one first light bar disposed on the first area, and at least one second light bar disposed on the second area.

According to the claimed invention, distributed position of the at least one first light bar and the at least one second light bar corresponds to distributed position of the plurality of light absorbing components.

According to the claimed invention, an arranged direction of the at least one first light bar is non-parallel to an arranged direction of the at least one second light bar.

According to the claimed invention, the arranged direction of the at least one first light bar is parallel to a short side of the supporting back plate, and the arranged direction of the at least one second light bar is parallel to a long side of the supporting back plate.

According to the claimed invention, the direct back-lit display further includes at least one first light bar disposed on the first area and at least one second light bar disposed on the second area. An illumination intensity of the at least one first light bar is lower than an illumination intensity of the at least one second light bar.

According to the claimed invention, an operation voltage of the at least one first light bar is lower than an operation voltage of the at least one second light bar.

According to the claimed invention, distributed density of the at least one first light bar is greater than distributed density of the at least one second light bar.

According to the claimed invention, an arranged direction of the at least one first light bar is non-parallel to an arranged direction of the at least one second light bar.

According to the claimed invention, a supporting back plate is applied to a direct back-lit display with a thin type, and the direct back-lit display with the thin type having a rear frame. The supporting back plate includes a first area, a second area, at least one first light bar and at least one second light bar. The second area is connected to the first area. A distance from the first area to the rear frame is greater than a distance from the second area to the rear frame. The at least one first light bar is disposed on the first area. The at least one second light bar is disposed on the second area.

According to the claimed invention, the supporting back plate further includes a third area disposed on a side of the second area opposite to the first area.

According to the claimed invention, the at least one first light bar is further disposed on the third area, an arranged direction of the at least one first light bar is parallel to a short side of the supporting back plate, and an arranged direction of the at least one second light bar is parallel to a long side of the supporting back plate.

The present disclosure can utilize the gradually inclined supporting back plate to form stage difference between the first casing and the second casing, and the circuit board and other electronic components can be disposed on the first area of the gradually inclined supporting back plate, so that the direct back-lit display can have the preferred thin type; in addition, the distance from the second area of the supporting back plate to the optical member is large, and the light bars disposed on the second area can have the lower distributed density, so that the direct back-lit display with the thin type in the present disclose can have an advantage of low cost.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
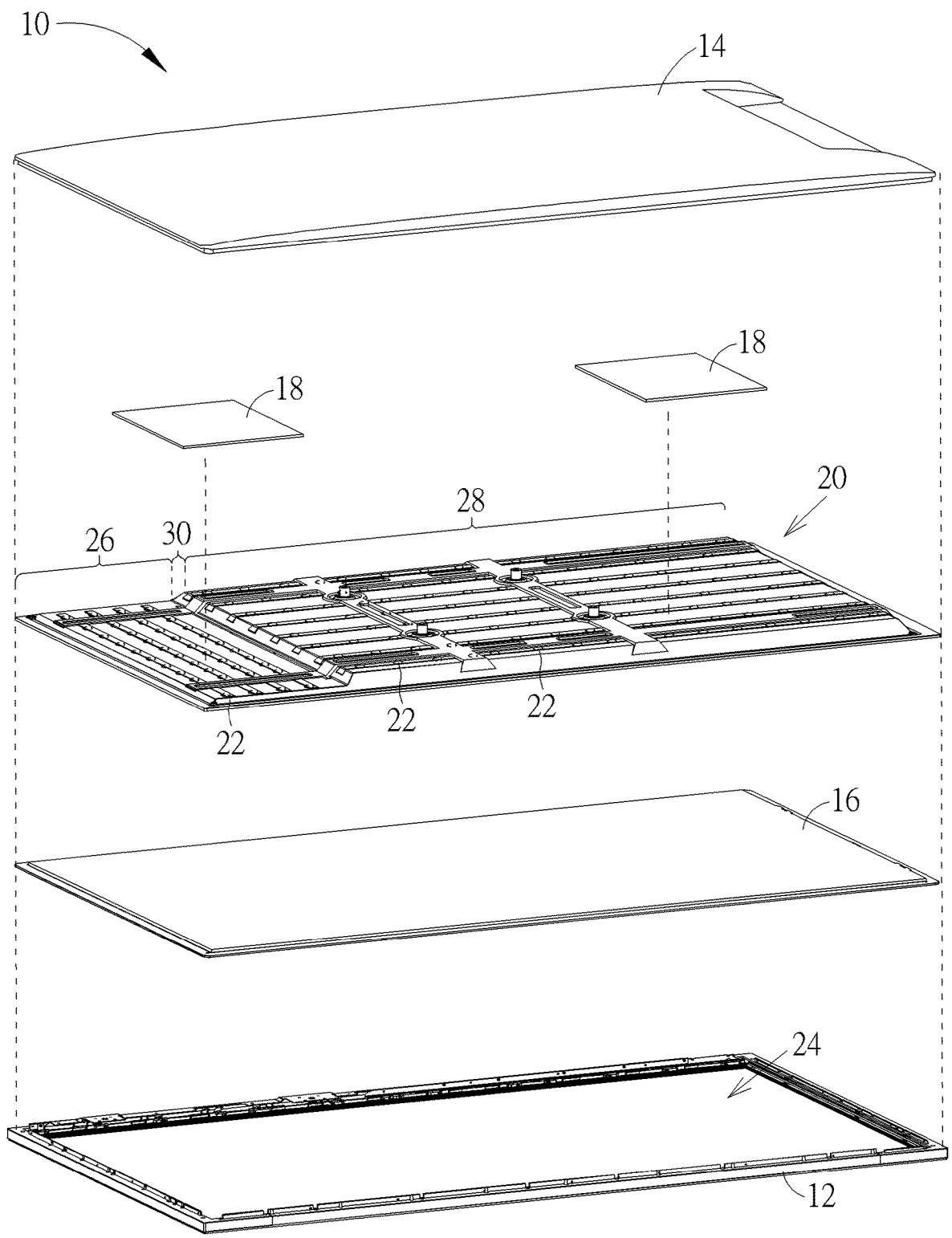
FIG. 1 is am exploded diagram of part of a direct back-lit display according to a first embodiment of the present disclosure.
Figure 2:
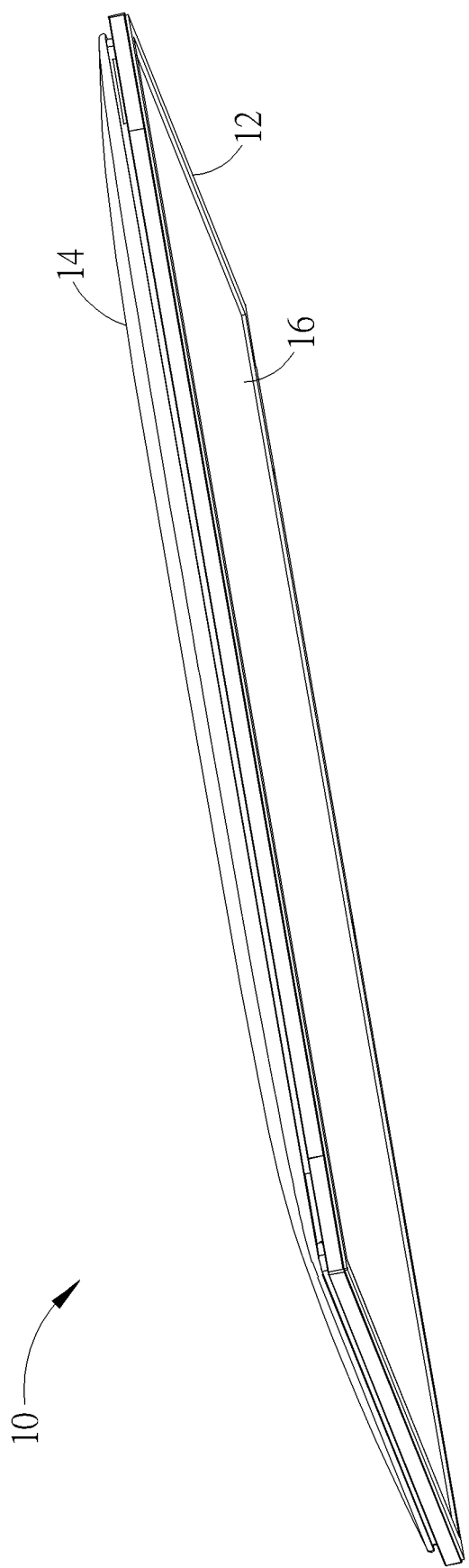
FIG. 2 is a diagram of the direct back-lit display according to the first embodiment of the present disclosure.
Figure 3:
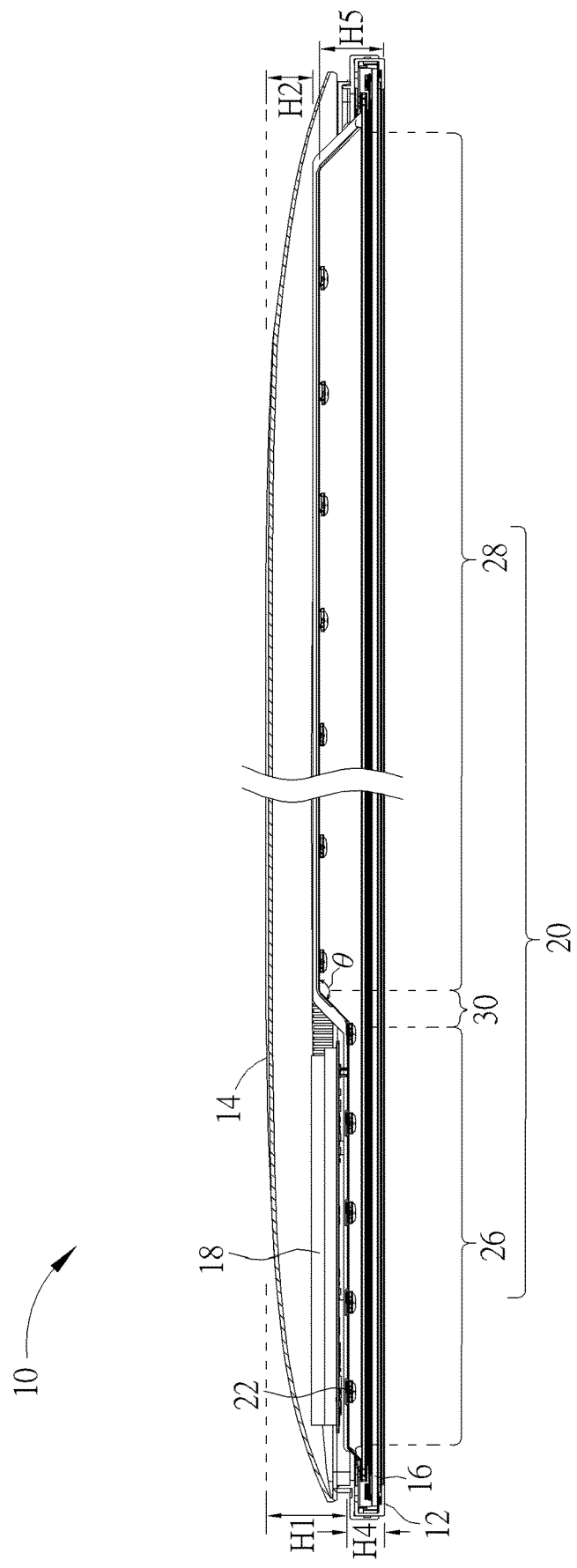
FIG. 3 is a sectional view of part of the direct back-lit display according to the first embodiment of the present disclosure.

Please refer to FIG. 1 to FIG. 3. FIG. 1 is am exploded diagram of part of a direct back-lit display 10 according to a first embodiment of the present disclosure. FIG. 2 is a diagram of the direct back-lit display 10 according to the first embodiment of the present disclosure. FIG. 3 is a sectional view of part of the direct back-lit display 10 according to the first embodiment of the present disclosure. The direct back-lit display 10 can include a first casing 12, a second casing 14, an optical member 16, a circuit board 18, a supporting back plate 20 and light bars 22. The first casing 12 can have an opening portion 24, and be a front frame of the direct back-lit display 10. The second casing 14 can be a rear frame of the direct back-lit display 10, and used to connect to the first casing 12 for covering other components so as to provide waterproof and dustproof protection.

The optical member 16 can be a part of a panel module. The optical member 16 can be disposed between the first casing 12 and the second casing 14, and be exposed via the opening portion 24 on the first casing 12. The direct back-lit display 10 can dispose electronic component, such as a main board, an operation processor, an interface card and a speaker box, on the circuit board 18. The supporting back plate 20 can be disposed between the second casing 14 and the optical member 16. In the first embodiment, the supporting back plate 20 can have a first area 26, a second area 28 and a bridging area 30 connected to each other. The bridging area 30 can be bent and connected between the first area 26 and the second area 28. Dimensional ratio of the first area 26 to the second area 28 is set in accordance with a design demand, and a detailed description is omitted herein for simplicity. Generally, an angle θ of the bridging area 30 relative to the first area 26 can be greater than ninety degrees, and an angle θ of the bridging area 30 relative to the second area 28 can be greater than ninety degrees, which depends on an actual demand.

As shown in FIG. 3, structural stage difference between the first area 26 and the second area 28 can be formed via the bridging area 30, which means a first distance H1 from the first area 26 to the second casing 14 can be greater than a second distance H2 from the second area 28 to the second casing 14, or a fourth distance H4 from the first area 26 to the first casing 12 can be smaller than a fifth distance H5 from the second area 28 to the first casing 12. Therefore, the direct back-lit display 10 can have an abundant chamber between the first area 26 and the second casing 14, and the circuit board 18 can be disposed on the first area 26 of the supporting back plate 20. The present disclosure can dispose the circuit board 18 and other electronic components of the direct back-lit display 10 on an area of the supporting back plate 20 excluding the second area 28, so that the second casing 14 can be near to the second area 28 of the supporting back plate 20, and the direct back-lit display 10 can have a preferred thin type.

It should be mentioned that the circuit board 18 can be disposed on a surface of the supporting back plate 20 facing the second casing 14, which means the circuit board 18 is located inside the chamber between the second casing 14 and the supporting back plate 20. The first distance H1 can be designed in accordance with structural heights of the circuit board 18 and the related electronic components. In addition, the light bars 22 can be disposed on a surface of the supporting back plate 20 facing the first casing 12, and be a backlight source of the panel module. Generally, the light bars 22 can be a diverging light source. The angles θ of the bridging area 30 relative to the first area 26 and the second area 28 can correspond to an illumination angle of the light bars 22, so as to prevent a shadow from being formed on the optical member 16 due to light of the light bars 22 being sheltered by an area of the supporting back plate 20.

Figure 4:
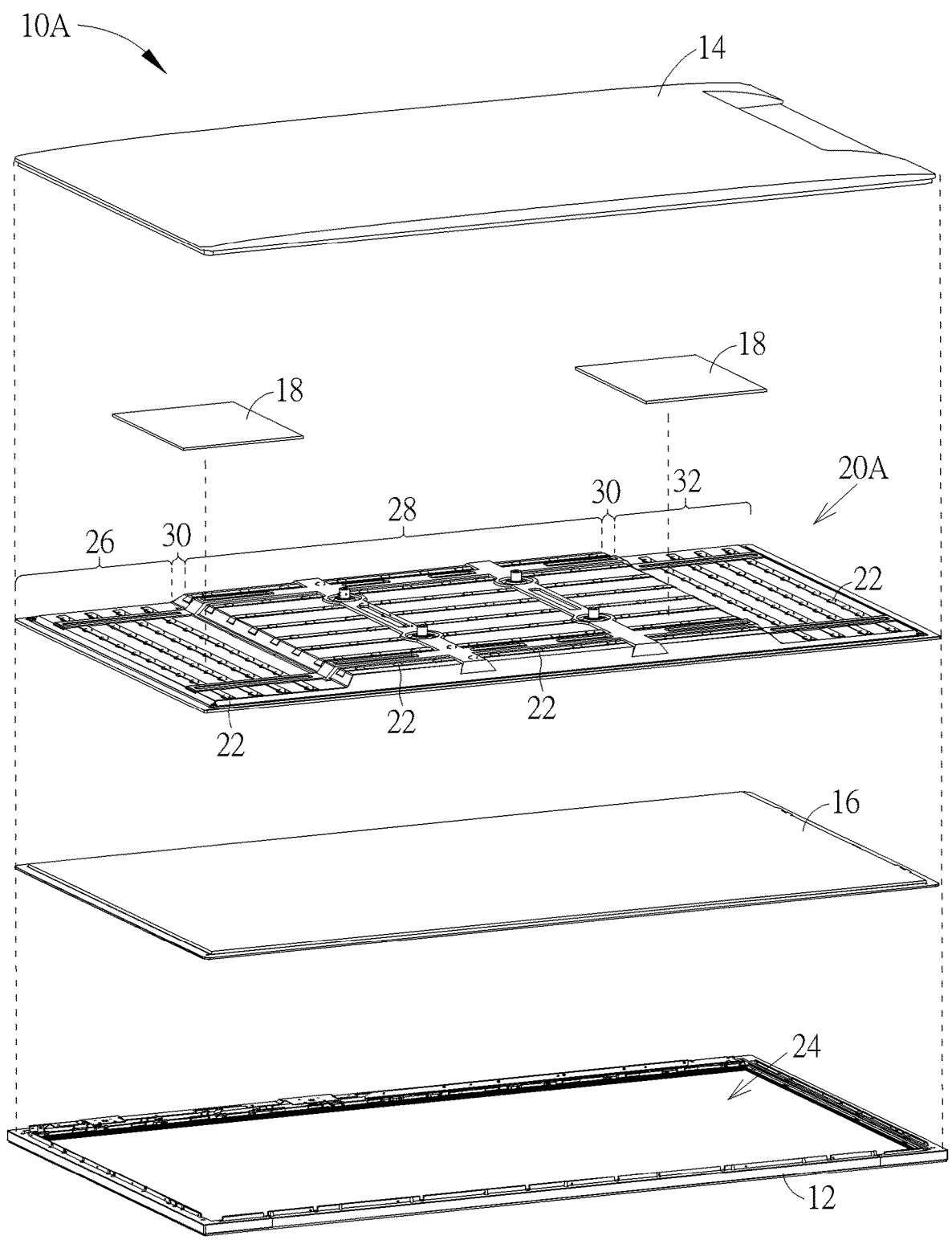
FIG. 4 is an exploded diagram of part of the direct back-lit display according to a second embodiment of the present disclosure.
Figure 5:
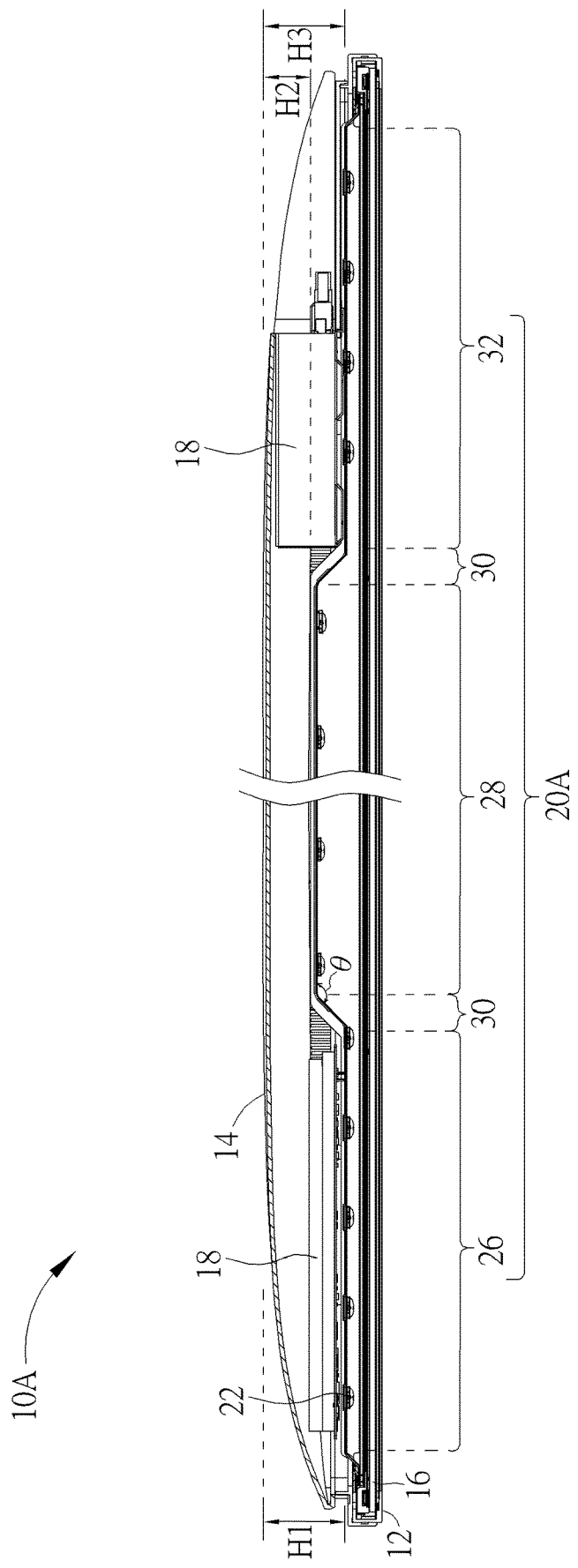
FIG. 5 is a sectional view of part of the direct back-lit display according to the second embodiment of the present disclosure.

Please refer to FIG. 4 and FIG. 5. FIG. 4 is an exploded diagram of part of the direct back-lit display 10A according to a second embodiment of the present disclosure. FIG. 5 is a sectional view of part of the direct back-lit display 10A according to the second embodiment of the present disclosure. In the second embodiment, elements having the same numeral as ones of the first embodiment have the same structures and functions, and the detailed description is omitted herein for simplicity. The supporting back plate 20A of the direct back-lit display 10A can include the first area 26, the second area 28, the bridging area 30 and a third area 32. The third area 32 can be located on a side of the second area 28 opposite to the first area 26. The bridging area 30 can be bent and connected between the first area 26 and the second area 28, and further between the second area 28 and the third area 32. The dimensional ratio of the first area 26 to the second area 28 and to the third area 32 can be set in accordance with the design demand, and the detailed description is omitted herein for simplicity.

As shown in FIG. 5, one structural stage difference between the first area 26 and the second area 28 can be formed via the bridging area 30, and another structural stage difference between the second area 28 and the third area 32 can be formed via the bridging area 30. A third distance H3 from the third area 32 to the second casing 14 can be greater than the second distance H2, and further can be the same as or different from the first distance H1; or a distance from the third area 32 to the first casing 12 can be smaller than a distance from the second area 28 to the first casing 12. In the second embodiment, the direct back-lit display 10A can include several circuit boards 18, which are respectively disposed on the first area 26 and the third area 32 of the supporting back plate 20A. The second casing 14 can be near to the second area 28 of the supporting back plate 20, so that the direct back-lit display 10A can have the preferred thin type.

Figure 6:
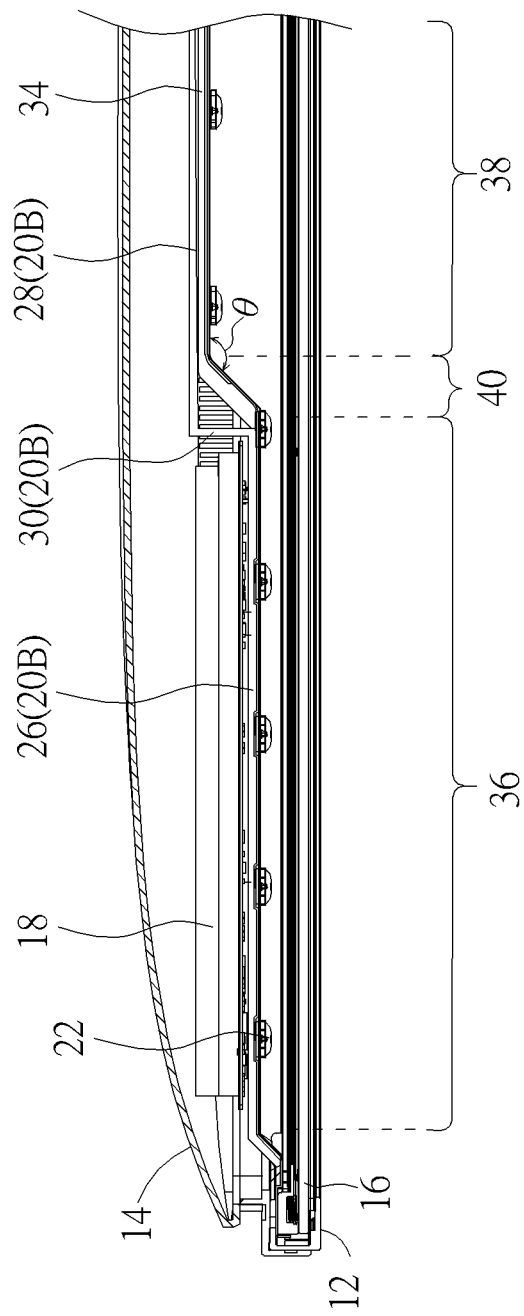
FIG. 6 is a sectional view of part of a supporting back plate according to another embodiment of the present disclosure.

Please refer to FIG. 6. FIG. 6 is a sectional view of part of the supporting back plate 20B according to another embodiment of the present disclosure. The angles of the bridging area 30 of the supporting back plate 20B relative to the first area 26 and relative to the second area 28 may be different from the illumination angle of the light bars 22; in the situation, the supporting back plate 20B preferably can include a reflection member 34 disposed on a surface of the supporting back plate 20B facing the first casing 12, and adapted to reflect light emitted by the light bars 22 toward the optical member 16. The reflection member 34 can have a first section 36, a second section 38 and a bridging section 40 connected to each other. Position and sizes of the first section 36 and the second section 38 can correspond to position and sizes of the first area 26 and the second area 28. The bridging section 40 can be bent and connected between the first section 36 and the second section 38.

In the embodiment, the angles θ of the bridging section 40 relative to the first section 36 and the second section 38 can be greater than ninety degrees, and an actual value of the angle θ can preferably correspond to the illumination angle of the light bars 22, so as to prevent a shadow from being formed on the optical member 16 due to the light of the light bars 22 being sheltered by a section of the reflection member 34.

Figure 7:
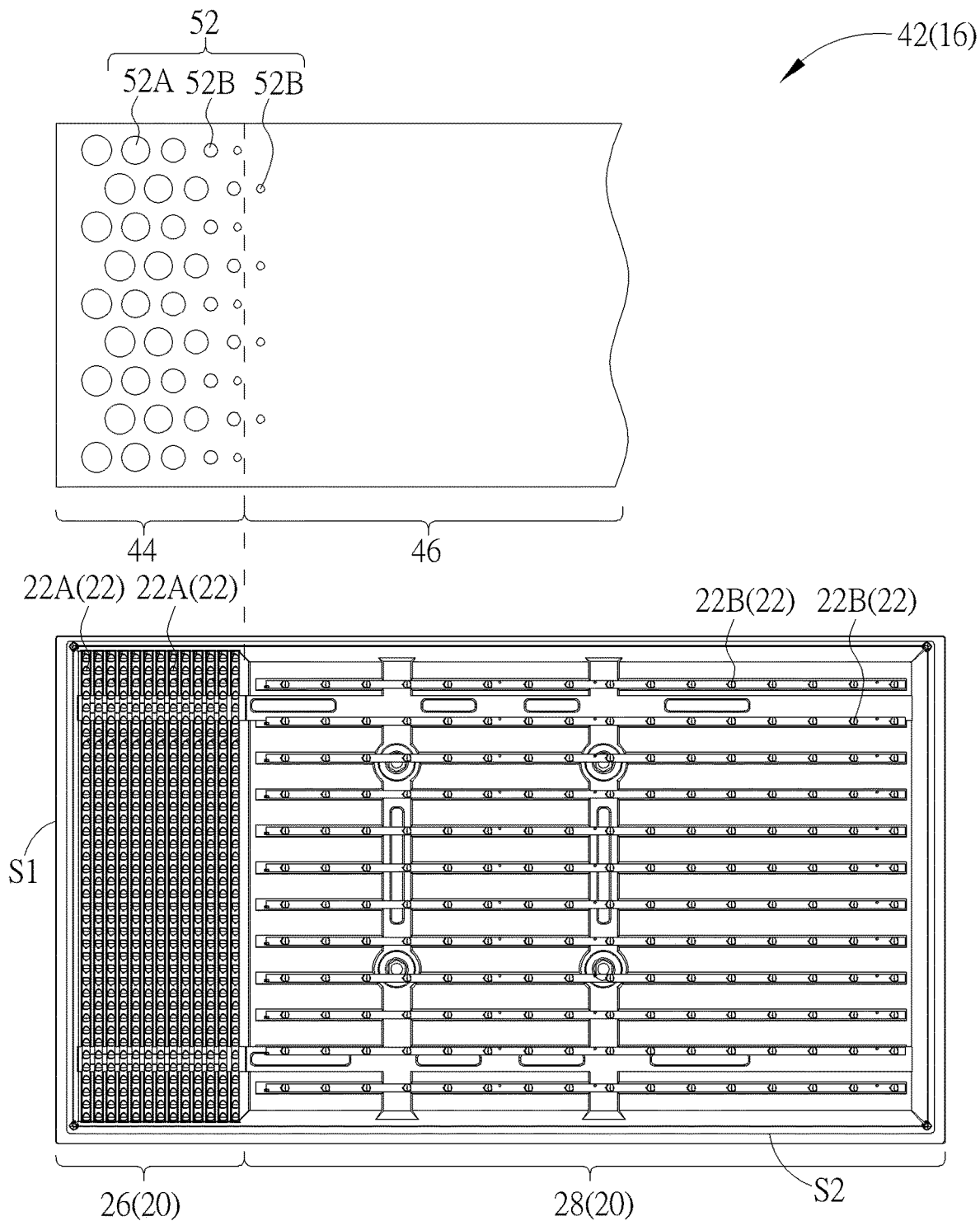
FIG. 7 is a diagram of part of an optical member according to the embodiment of the present disclosure.

Please refer to FIG. 7. FIG. 7 is a diagram of part of the optical member 16 according to the embodiment of the present disclosure. The optical member 16 can include a diffusing member 42, such as a diffuser film or a diffuser plate. The diffusing member 42 can include a first region 44 and a second region 46 connected to each other. The first region 44 and the second region 46 can respectively correspond to the first area 26 and the second area 28 of the supporting back plate 20B. The light bars 22 can include a plurality of first light bars 22A and plurality of second light bars 22B. The first light bars 22A can be disposed on the first area 26, and the second light bars 22B can be disposed on the second area 28. The first light bars 22A can be near to the optical member 16; if an illumination intensity of the first light bars 22A is the same as or similar to an illumination intensity of the second light bar 22B, a shading rate provided by the first region 44 can be preferably greater than a shading rate provided by the second region 46, and therefore the optical member 16 can show uniform illumination.

The present disclosure can dispose a plurality of light absorbing components 52 on the diffusing member 42 to let the first region 44 have the shading rate different from the shading rate of the second region 46. The light absorbing components 52 may include light absorbing components 52A disposed on the first region 44 and light absorbing components 52B disposed on a border between the first region 44 and the second region 46, and light absorbing efficiency of the light absorbing component 52 disposed on the first region 44 can be greater than light absorbing efficiency of the light absorbing component 52 disposed on the border between the first region 44 and the second region 46. The present disclosure can change superficial measure of the light absorbing component 52 to adjust the light absorbing efficiency; however, at least one of a thickness, material and density of the light absorbing component 52 can be applied for adjustment of the light absorbing efficiency, which depends on the design demand.

Besides, the light absorbing component 52 may be disposed on the first region 44, the border between the first region 44 and the second region 46, and the second region 46. The light absorbing efficiency of the light absorbing component 52 disposed on the border between the first region 44 and the second region 46 can be smaller than the light absorbing efficiency of the light absorbing component 52 disposed on the first region 44, and greater than the light absorbing efficiency of the light absorbing component 52 disposed on the second region 46. The present disclosure can utilize printed dots or filter material to be the light absorbing component 52, and an application of the light absorbing component 52 is not limited to the above-mentioned embodiments. The diffusing member 42 may be manufactured via physical process or chemical process, so that several regions on the diffusing member 42 can respectively have different light absorbing efficiency or different shading rates.

Each of the first light bars 22A and each of the second light bars 22B can individually have one or more than one lighting units (which are not shown in the figures), and distributed position of each lighting unit on the first light bars 22A and the second light bars 22B can preferably correspond to distributed position of the plurality of light absorbing components 52, which means each lighting unit of the first light bars 22A and the second light bars 22B can align with one light absorbing component 52 that has corresponding position, so that the optical member 16 can show the uniform illumination. As shown in FIG. 7, an arranged direction of the first light bar 22A is non-parallel to an arranged direction of the second light bar 22B, which means the arranged direction of the first light bar 22A can be parallel to a short side S1 of the supporting back plate 20 and the arranged direction of the second light bar 22B can be parallel to a long side S2 of the supporting back plate 20; however, the first light bar 22A and the second light bar 22B may be optionally arranged in the same direction, which depends on the design demand.

In other possible embodiment, the diffusing member 42 of the optical member 16 may have no light absorbing component 52; in the meantime, the illumination intensity of the first light bar 22A can be lower than the illumination intensity of the second light bar 22B. The distance from the first area 26 of the supporting back plate 20 to the optical member 16 can be shorter than the distance from the second area 28 of the supporting back plate 20 to the optical member 16, and the illumination intensity of the first light bars 22A disposed on the first area 26 can be preferably decreased to let the optical member 16 show the uniform illumination. The present disclosure further can drive the first light bar 22A via a low operation voltage, and drive the second light bar 22B via a high operation voltage; further, the present disclosure may decrease a number of the first light bars 22A or the related lighting units, and distributed density of the first light bars 22A can be greater than distributed density of the second light bar 22B, so that the illumination intensity of the first light bars 22A can be lower than the illumination intensity of the second light bars 22B.

Figure 8:
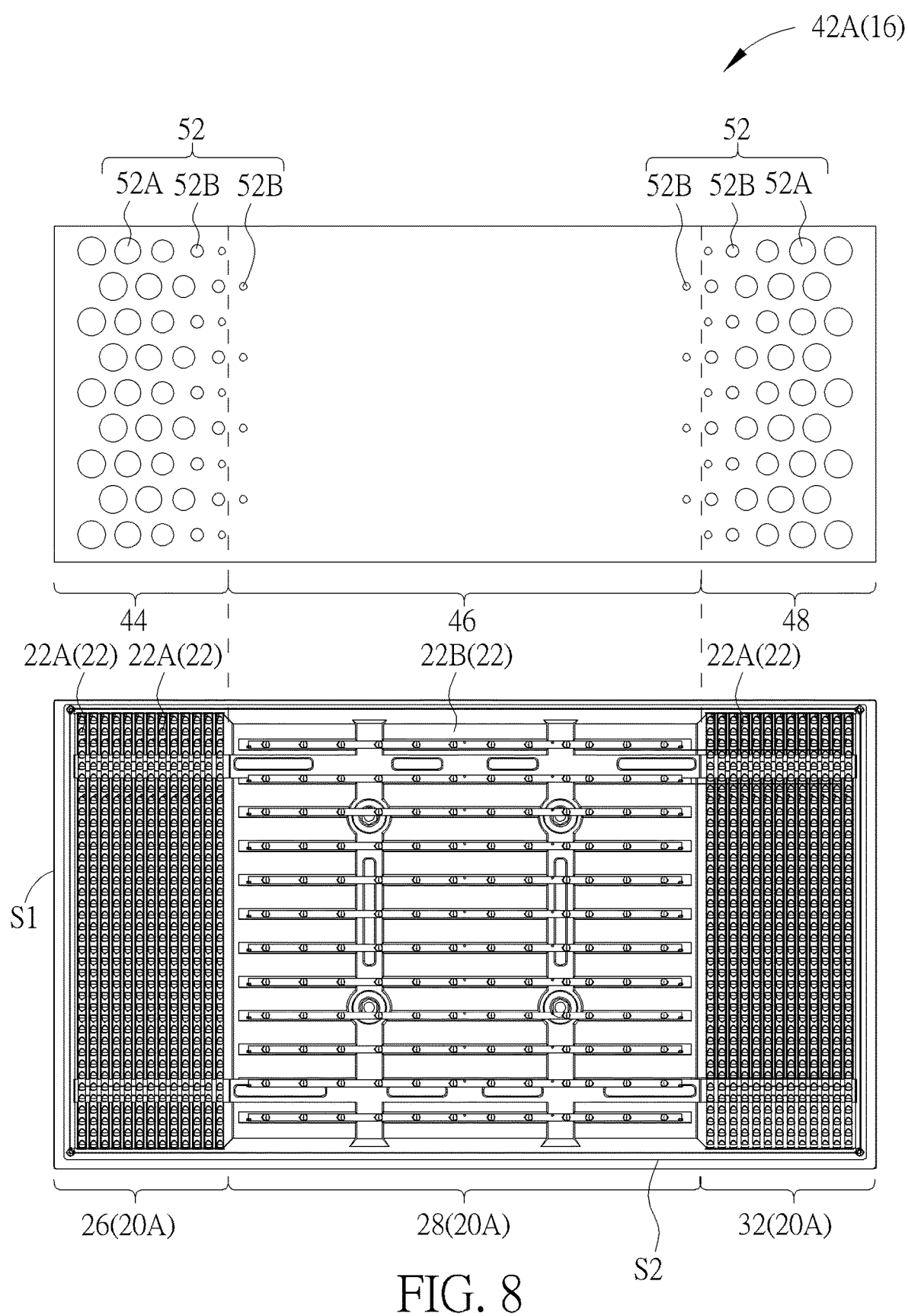
FIG. 8 is a diagram of part of the optical member 1 according to another embodiment of the present disclosure.

Please refer to FIG. 8. FIG. 8 is a diagram of part of the optical member 16 according to another embodiment of the present disclosure. The diffusing member 42A of the optical member 16 can include the first region 44, the second region 46 and a third region 48 connected to each other. The first region 44 and the third region 48 can be respectively disposed on two opposite sides of the second region 46. The first region 44, the second region 46 and the third region 48 can respectively correspond to the first area 26, the second area 28 and the third area 32 of the supporting back plate 20A. The light bars 22 can include the plurality of first light bars 22A and the plurality of second light bars 22B. The first light bars 22A can be disposed on the first area 26 and the third area 32. The second light bars 22B can be disposed on the second area 28. The first light bar 22A can be near to the optical member 16; if the illumination intensity of the first light bar 22A is the same as or similar to the illumination intensity of the second light bar 22B, the shading rates provided by the first region 44 and the third region 48 can be preferably greater than the shading rate provided by the second region 46, so that the optical member 16 can show the uniform illumination. Features of the light absorbing components 52 on the diffusing member 42A can be the same as the foresaid embodiment, and the detailed description is omitted herein for simplicity.

In conclusion, the direct back-lit display of the present disclosure can have the gradually inclined supporting back plate with the structural stage difference, and the circuit board can be disposed on sunken place of the gradually inclined supporting back plate, so that the direct back-lit display can have the preferred thin type. The supporting back plate can at least include the first area on a lateral side and the second area on a center; the distance from the second area to the second casing is short, and the distance from the first area to the second casing is long. The circuit board is not disposed between the second area and the second casing, and therefore the chamber between the second area and the second casing can be reduced accordingly, to move the second casing close to the first casing. The first area can be the sunken place of the gradually inclined supporting back plate, and used to hold the circuit board. The distance from the first area to the second casing can be identical with or greater than the structural height of the circuit board, and a thickness of the center of the direct back-lit display can be greater than a thickness of the lateral side of the direct back-lit display.

Moreover, the distance from the second area of the supporting back plate to the optical member is large, and the second light bars disposed on the second area can have the lower distributed density, which means the number of the second light bars and the related lighting units can be decreased, so as to effectively economize the number and cost of the light bars. Comparing to the prior art, the direct back-lit display of the present disclosure can utilize the gradually inclined supporting back plate to form stage difference between the first casing and the second casing, and the circuit board and other electronic components can be disposed on the first area of the gradually inclined supporting back plate, so that the direct back-lit display can have the preferred thin type; in addition, the distance from the second area of the supporting back plate to the optical member is large, and the light bars disposed on the second area can have the lower distributed density, so that the direct back-lit display with the thin type in the present disclose can have an advantage of low cost.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A supporting back plate comprising:
   a first area defining a first plane;
   a second area connected to the first area, the second area defining a second plane, wherein the first plane is parallel to and offset from the second plane;
   at least one first light bar disposed on the first area;
   at least one second light bar disposed on the second area; and
   a diffusing member having a first region and a second region connected to each other, a plurality of light absorbing components being disposed on the diffusion member, one of the plurality of light absorbing components disposed on the first region has a light absorbing efficiency greater that a light absorbing efficiency of another light absorbing component disposed on the second region,
   wherein, the first region corresponds to the first area, and the second region corresponds to the second area, and the first area is closer to the diffusing member than the second area.

2. The supporting back plate of claim 1, wherein the supporting back plate further comprises a third area disposed on a side of the second area opposite to the first area.

3. The supporting back plate of claim 2, wherein the at least one first light bar is further disposed on the third area, an arranged direction of the at least one first light bar is parallel to a short side of the supporting back plate, and an arranged direction of the at least one second light bar is parallel to a long side of the supporting back plate.

4. A direct backlight comprising:
   a first casing having an opening portion;
   a second casing connected to the first casing;
   an optical member disposed between the first casing and the second casing, and exposed via the opening portion, wherein the optical member comprises a diffusing member, the diffusing member has a first region and a second region connected to each other, a shading rate of the first region being different from a shading rate of the second region, the optical member further comprises a plurality of light absorbing components disposed on the diffusion member, one of the plurality of light absorbing components disposed on the first region has a light absorbing efficiency greater than a light absorbing efficiency of another light absorbing component disposed on the second region;
a supporting back plate disposed between the second casing and the optical member, the supporting back plate having a first area corresponding to the first region, and a second area corresponding to the second region, the first and second areas connected to each other, a distance from the first area to the second casing being greater than a distance from the second area to the second casing, or a distance from the first area to the first casing being smaller than a distance from the second area to the first casing;
at least one circuit board disposed on the first area; and
a plurality of light bars disposed on the supporting back plate.

5. The direct backlight of claim 4, wherein the supporting back plate further has a bridging area connected between the first area and the second area, an angle of the bridging area relative to the first area is greater than ninety degrees, or an angle of the bridging area relative to the second area is greater than ninety degrees.

6. The direct backlight of claim 4, wherein the supporting back plate further has a third area disposed on a side of the second area opposite to the first area, a distance from the third area to the second casing is greater than the distance from the second area to the second casing, or a distance from the third area to the first casing is smaller than a distance from the second area to the first casing.

7. The direct backlight of claim 4, wherein one of the plurality of light absorbing components disposed on a border between the first region and the second region has light absorbing efficiency smaller than the light absorbing efficiency of other light absorbing component disposed on the first region, and greater than the light absorbing efficiency of other light absorbing component disposed on the second region.

8. The direct backlight of claim 4, wherein the plurality of light absorbing components is printed dots or filter material.

9. The direct backlight of claim 4, wherein the supporting back plate comprises a reflection member, the reflection member has a first section, a second section and a bridging section connected to each other, the first section and the second section respectively correspond to the first area and the second area, the bridging section is bent between the first section and the second section, an angle of the bridging section relative to the first section is greater than ninety degrees, and an angle of the bridging section relative to the second section is greater than ninety degrees.

10. The direct backlight of claim 9, wherein the angle corresponds to an illumination angle of at least one of the plurality of light bars.

11. The direct backlight of claim 4, wherein the direct back-lit display further comprises at least one first light bar disposed on the first area and at least one second light bar disposed on the second area, an illumination intensity of the at least one first light bar is lower than an illumination intensity of the at least one second light bar.

12. The direct backlight of claim 11, wherein an operation voltage of the at least one first light bar is lower than an operation voltage of the at least one second light bar.

13. The direct backlight of claim 11, wherein distributed density of the at least one first light bar is greater than distributed density of the at least one second light bar.

14. The direct backlight of claim 11, wherein an arranged direction of the at least one first light bar is non-parallel to an arranged direction of the at least one second light bar.

15. The direct backlight of claim 4, wherein the direct back-lit display further comprises at least one first light bar disposed on the first area, and at least one second light bar disposed on the second area.

16. The direct backlight of claim 15, wherein distributed position of the at least one first light bar and the at least one second light bar corresponds to distributed position of the plurality of light absorbing components.

17. The direct backlight of claim 15, wherein an arranged direction of the at least one first light bar is non-parallel to an arranged direction of the at least one second light bar.

18. The direct backlight of claim 17, wherein the arranged direction of the at least one first light bar is parallel to a short side of the supporting back plate, and the arranged direction of the at least one second light bar is parallel to a long side of the supporting back plate.

* * * * *